US012723698B1

(12) United States Patent
Pruett et al.

(10) Patent No.: US 12,723,698 B1
(45) Date of Patent: Sep. 1, 2026

(54) DEVICES FOR PERFORMING MAINTENANCE IN A PIPELINE AND METHODS FOR DRIVING THE DEVICES TOWARD A LAUNCH PORT

(71) Applicant: WeldFit LLC, Houston, TX (US)

(72) Inventors: Rick D. Pruett, Sapulpa, OK (US); David W. Albertson, Skiatook, OK (US); Gregory Joseph Drzewiecki, Woodstock, IL (US)

(73) Assignee: WELDFIT LLC, Houston, TX (US)

( * ) Notice: Subject to any disclaimer, the term of this patent is extended or adjusted under 35 U.S.C. 154(b) by 0 days.

(21) Appl. No.: 19/371,313

(22) Filed: Oct. 28, 2025

Related U.S. Application Data

(60) Provisional application No. 63/858,137, filed on Aug. 5, 2025.

(51) Int. Cl.
*F16L 55/40* (2006.01)
*F16L 101/10* (2006.01)

(52) U.S. Cl.
CPC .......... *F16L 55/40* (2013.01); *F16L 2101/10* (2013.01)

(58) Field of Classification Search
CPC .......... F16L 55/40; F16L 2101/10
USPC .......... 138/97
See application file for complete search history.

(56) References Cited

U.S. PATENT DOCUMENTS 3,939,519 A * 2/1976 Muirhead .......... F28G 1/12 15/104.061
4,069,535 A * 1/1978 Cato .......... B08B 9/0557 15/104.061
4,083,074 A * 4/1978 Curtis .......... B08B 9/0553 166/170
4,275,475 A * 6/1981 Schwartz .......... B08B 9/0557 15/104.061
4,365,379 A * 12/1982 Neff .......... B08B 9/0557 15/104.061
4,603,449 A * 8/1986 Knapp .......... B08B 9/0557 15/104.061
5,457,841 A * 10/1995 Minton .......... B08B 9/0557 15/104.061
5,960,505 A 10/1999 Sanghoon et al.
6,067,682 A * 5/2000 Rankin .......... B08B 9/0557 15/104.061
10,801,658 B2 10/2020 Poe et al.
12,194,514 B2 * 1/2025 Alrasheed .......... B08B 9/0551
2004/0200019 A1 * 10/2004 Pruett .......... F16L 58/1027 15/104.061
2009/0199873 A1 * 8/2009 Pruett .......... B08B 9/055 134/22.12
2015/0059498 A1 * 3/2015 Di Lullo .......... F16L 55/38 73/865.8

(Continued)

FOREIGN PATENT DOCUMENTS

CN 205165097 U 4/2016

*Primary Examiner* — David R Deal
(74) *Attorney, Agent, or Firm* — William R. Childs; Childs Patent Law PLLC

(57) ABSTRACT

Devices or pigs for performing maintenance on a pipeline are disclosed herein as well as methods of driving the devices into a launch port of a device launcher. Benefits of the devices can include being able to load several devices into a device launcher and preventing or reducing instances of multiple devices accidentally being launched as one or more of the devices is moved toward the launch port of the device launcher.

14 Claims, 5 Drawing Sheets

(56) References Cited

U.S. PATENT DOCUMENTS

2021/0039144 A1* 2/2021 Boyd ..................... F16L 55/26

* cited by examiner

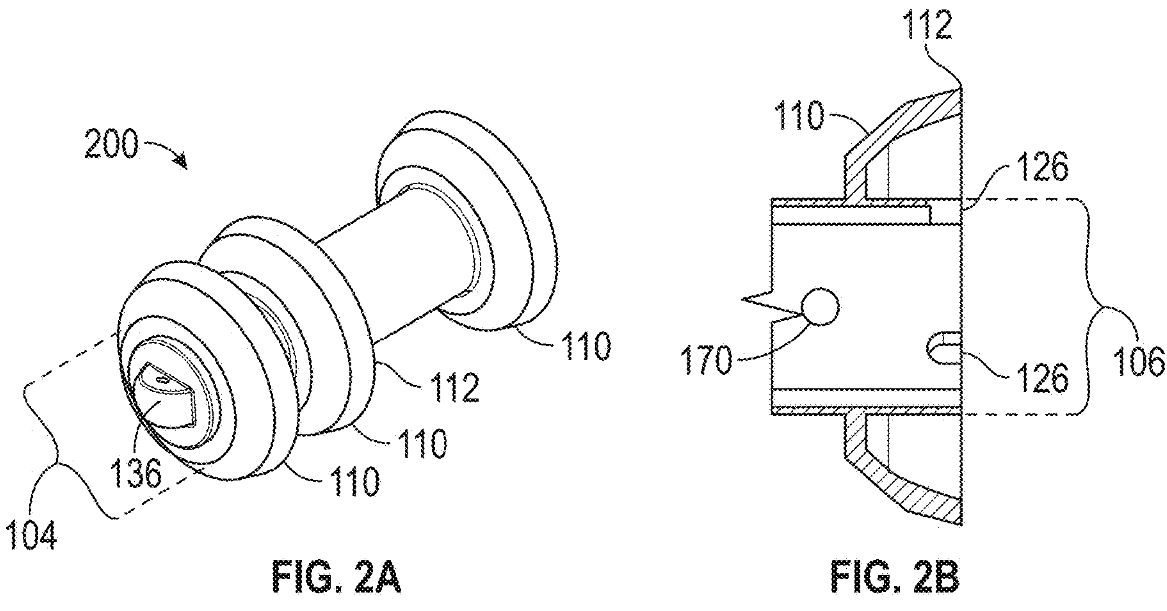
FIG. 2A
FIG. 2B
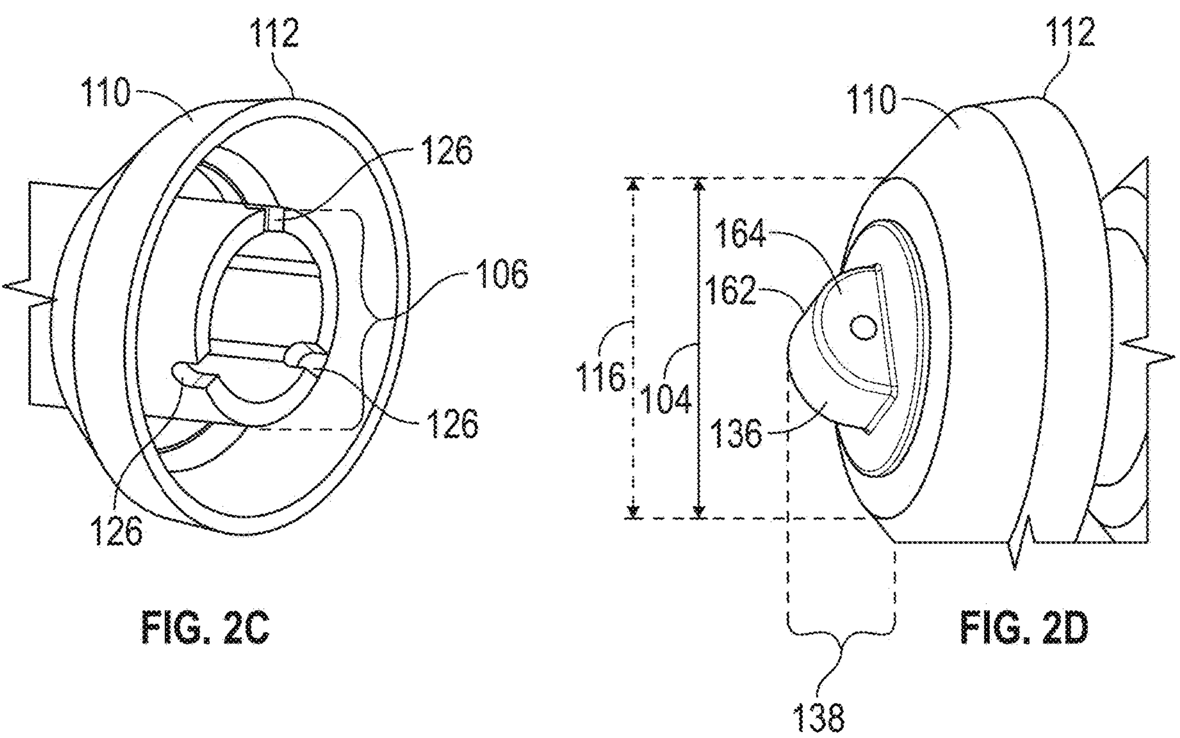
FIG. 2C
FIG. 2D 416
414
418
422
420
400
402
404
406
408
410
412

DEVICES FOR PERFORMING MAINTENANCE IN A PIPELINE AND METHODS FOR DRIVING THE DEVICES TOWARD A LAUNCH PORT

CROSS-REFERENCE TO RELATED APPLICATIONS

This application is a non-provisional application and claims priority to U.S. Provisional Patent Application No. 63/858,137, entitled "DEVICES FOR PERFORMING MAINTENANCE IN A PIPELINE AND METHODS FOR DRIVING THE DEVICES TOWARD A LAUNCH PORT," filed on Aug. 5, 2025, the entirety of which is incorporated by reference.

TECHNICAL FIELD

The present disclosure relates to the field of pipelines as well as products, systems, and methods of repairing or maintaining pipelines when the pipelines are in use and carry a product or fluid within. More specifically, the disclosed subject matter relates to pigs (devices) and methods for staging multiple pigs and launching them individually from pig launchers capable of holding multiple pigs simultaneously.

BACKGROUND

It is often necessary to perform maintenance or cleaning on a pipeline while the pipeline is in use and contains product. For example, once a nuclear power reactor is operating, it can be difficult or impossible to quickly stop the reactor. Therefore, it is critical that water used to cool the reactor be allowed to flow unimpeded, even during repairs and maintenance of pipes. Similarly, stopping production of an oil pipeline could delay production, resulting in lost profits.

Pigging systems are installed on pipeline systems for the purpose of inserting a pipeline pig without interruption of the pipeline flow. Pipeline pigs are typically sized to the nominal pipeline diameter and configured to have different designs and/or materials to serve the purpose of cleaning, liquid removal, drying, batching, chemical treatment, or inspection. Traditional pigging systems (sometimes known as pig launchers and pig receivers) have been used to insert and retrieve pipeline pigs without interrupting the product flow. The launcher is installed upstream in the traditional pigging system, and the receiver unit is installed downstream of the section of the pipeline to be pigged.

Considering the importance of maintaining pipelines in modern industry, it is desirable to improve the tools, methods, and systems used for maintaining such pipelines. It remains desirable to provide products, methods, and systems for pigging that avoid defective operations.

SUMMARY

A device for performing maintenance on a pipeline is disclosed herein. In some embodiments, the device includes a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the back lip shape includes a raised portion and a recessed portion; and wherein one, two, three, or four of the device front face, the device back lip, the device side, and the one to nine wings include a polymer material; or wherein the device includes a hollow interior, wherein the hollow interior has a hollow interior length, wherein the hollow interior length is from about 30% to 95% of a device length, and the device back lip is a back lip opening of the hollow interior; or both.

In some embodiments of the device, two, three, or four of the device front face, the device back lip, the device side, and the one to nine wings include the polymer material; or wherein the polymer material is an elastomeric polymer; or wherein the polymer material includes a polyurethane, a high-density polyethylene, or a polybutylene succinate rubber, or any combination thereof; or wherein two, three, or four of the device front face, the device back lip, the device side, and the one to nine wings include and are connected by the polymer material; or wherein the device body includes or consists of the polymer material; or wherein the device body is injection molded or cast molded from the polymer material; or any combination thereof. In some embodiments of the device, the hollow interior includes a device interior surface and a hollow interior internal diameter; and wherein the hollow interior diameter is about equal to or less than the back lip internal diameter for at least a portion of the hollow interior length; or wherein the device interior surface includes a device side interior surface connected to a device front interior surface, wherein the device side includes a device side exterior surface, and wherein the device back lip connects the device side interior surface and the device side exterior surface, and wherein the hollow interior diameter is about less than or equal to the back lip internal diameter; or any combination thereof. In some embodiments of the device, the raised portion includes a segment of a raised lip and the recessed portion includes one or more recesses separating the segment of the raised lip; or wherein the raised portion includes a segment of a raised lip, and the recessed portion includes one or more recesses separating the segment of the raised lip, and wherein the recessed portion extends a recessed length from the raised lip toward the device front face; or wherein the raised portion includes a raised number of raised lips and a recessed number of recesses, and the raised number equals the recessed number, and the recessed portions separate the raised lips; or wherein the raised portion includes a raised number of raised lips and a recessed number of recesses, and the raised number equals the recessed number, and the recessed portions separate the raised lips, and the recessed number is from 1-16; or wherein the raised portion includes a raised lip and the recessed portion includes 1-16 notches or vents located along the raised lip; wherein the device side includes a device side interior surface and a device side exterior surface, and the raised shape connects the device side interior surface and a device side exterior surface; or wherein the raised portion includes two or more protrusions forming a raised lip and the recessed portion includes two or more recesses, and the two or more recesses separate the two or more protrusions; or any combination thereof. In some embodiments of the device, the back lip internal diameter is from about 70% to about 60% of the wing external diameter; or wherein the back lip internal diameter is less than the front face diameter and the back lip external diameter is about 50% to 110% of the front face diameter; or wherein the back lip internal diameter is less than the front face diameter and the back lip external diameter is about 90% to 110% of the front face diameter; or wherein the back lip internal diameter complements or substantially matches the front face diameter; or wherein the device includes a device interior surface, and wherein the device side includes a device side interior surface and a device side exterior surface, and the device interior surface includes the device side interior surface, and the device back lip connects the device side interior surface and the device side exterior surface; or wherein the front face includes a front protrusion, and the front protrusion extends a front protrusion length away from the device front face; or wherein the wings have a concave opening and the concave opening faces toward the device back lip, or wherein the wings have about planar sides; or any combination thereof. In some embodiments of the device, the device side includes a device external surface, and the device external surface has a side external diameter and the side external diameter is greater than or substantially equal to the front face diameter; or wherein the device side includes a device external surface, and the device external surface has a side external diameter and the side external diameter is substantially equal to the back lip external diameter; or wherein the device has a device length and the device length is from 130% to about 170% of the wing external diameter; wherein the device has a device length and the device length is from 170% to about 230% of the wing external diameter; or any combination thereof. In some embodiments of the device, the front face includes a front protrusion, and the front protrusion extends a front protrusion length away from the device front face, and wherein front protrusion has a tapering front protrusion shape having a semi-circular shape or an elliptical shape; or wherein the front face includes a front protrusion, and the front protrusion extends a front protrusion length away from the device front face, and wherein front protrusion has a tapering front protrusion shape having from 1, 2, 3, 4, 5, 6, 7, or 8 or more substantially flat protrusion sides; or any combination thereof.

A method of performing maintenance on a pipeline is disclosed herein. In some embodiments, the method includes providing a device launcher operatively connected to a pipeline by a launch port, wherein the pipeline has an upstream direction, a downstream direction, a pipeline internal diameter, the pipeline contains a product, and the device launcher includes a launch bay having a launch bay length and a launch bay diameter, and providing a device, wherein the device includes a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the back lip shape includes a raised portion and a recessed portion; and wherein one, two, three, or four of the device front face, the device back lip, the device side, and the one to nine wings include a polymer material; or wherein the device includes a hollow interior, wherein the hollow interior has a hollow interior length, wherein the hollow interior length is from about 30% to 95% of a device length, and the device back lip is a back lip opening of the hollow interior; or both; and inserting the device into the launch bay of the device launcher with the device front face closer to the launch port than the device back lip.

In some embodiments, the method further includes providing a second device, wherein the second device includes a second device body, wherein the second device body includes a second device front face connected to a second device back lip by a second device side, wherein the second device side includes one to nine wings extending outward from the device side, and the wings have a second outermost lip having a second wing external diameter, wherein the second device front face includes a second front face diameter, wherein the second device back lip includes a second back lip shape, wherein the second back lip shape includes a second back lip internal diameter and a second back lip external diameter, wherein the second back lip internal diameter is less than or equal to the second wing external diameter, and wherein the second back lip shape includes a second raised portion and a second recessed portion; and wherein one, two, three, or four of the second device front face, the second device back lip, the second device side, and the one to nine wings include a second polymer material; or wherein the second device includes a second hollow interior, wherein the second hollow interior has a second hollow interior length, wherein the second hollow interior length is from about 30% to 95% of a second device length, and the second device back lip is a second back lip opening of the second hollow interior; or both; and inserting the second device into the launch bay of the device launcher with the second device front face closer to the launch port than the second device back lip. In some embodiments, the method further includes bringing the device back lip into contact with the second device front face or a second device wing, or both. In some embodiments, the method further includes driving the device toward the launch port by pressing the second device front face, the second device wing, or both, against the device back lip. In some embodiments of the method, the launch bay length is from 3.5 to 17 times the pipeline internal diameter; or the launch bay diameter is within about 10% of the pipeline internal diameter; or both. In some embodiments, the method further includes providing from 4 to 10 of the devices; forming pairs of devices, including a device closer to the launch port adjacent to a device further from the launch port by inserting each device into the launch bay of the device launcher with each device front face closer to the launch port than each device back lip; bringing the device back lip of the device closer to the launch port into contact with the front face of the device further from the launch port; and driving the device closer the launch port toward the launch port by pressing the front face of the device further from the launch port against the device back lip of the device closer to the launch port.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

FIG. 2A, is an illustration showing the device from FIG. 1A, shown from a front, off-axis view.

FIG. 2B is a cutaway diagram, showing a close up of the back of the device of FIG. 1A.

FIG. 2C is an illustration showing the device of FIG. 1A, shown from the back, off-axis view.

FIG. 2D, is an illustration showing the device of FIG. 1A, shown from a front, off-axis view.

DETAILED DESCRIPTION

Figure 1A:
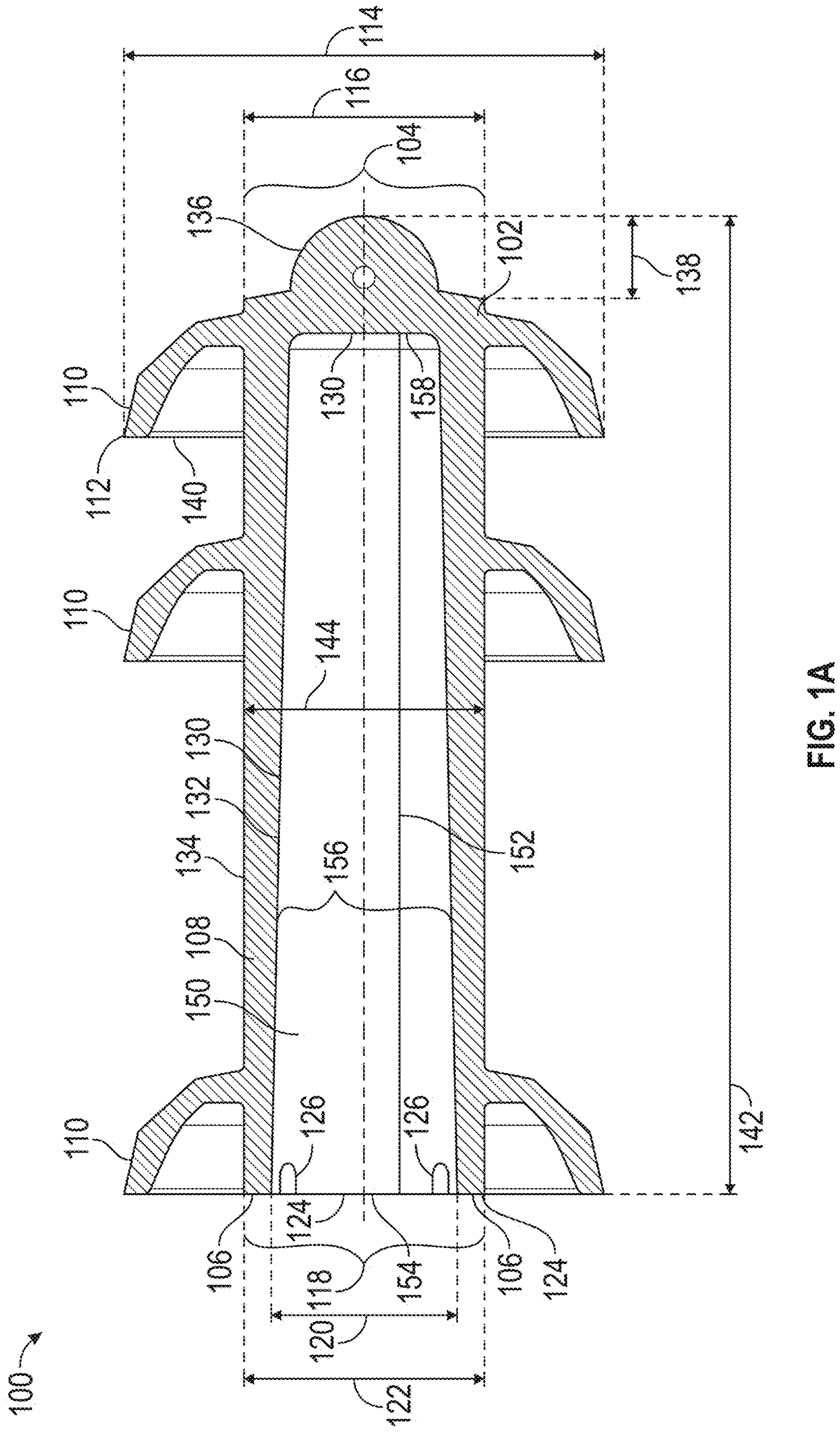
FIG. 1A shows a cutaway diagram of an embodiment of a device as disclosed herein, showing a side view.
Figures 1B, 1C:
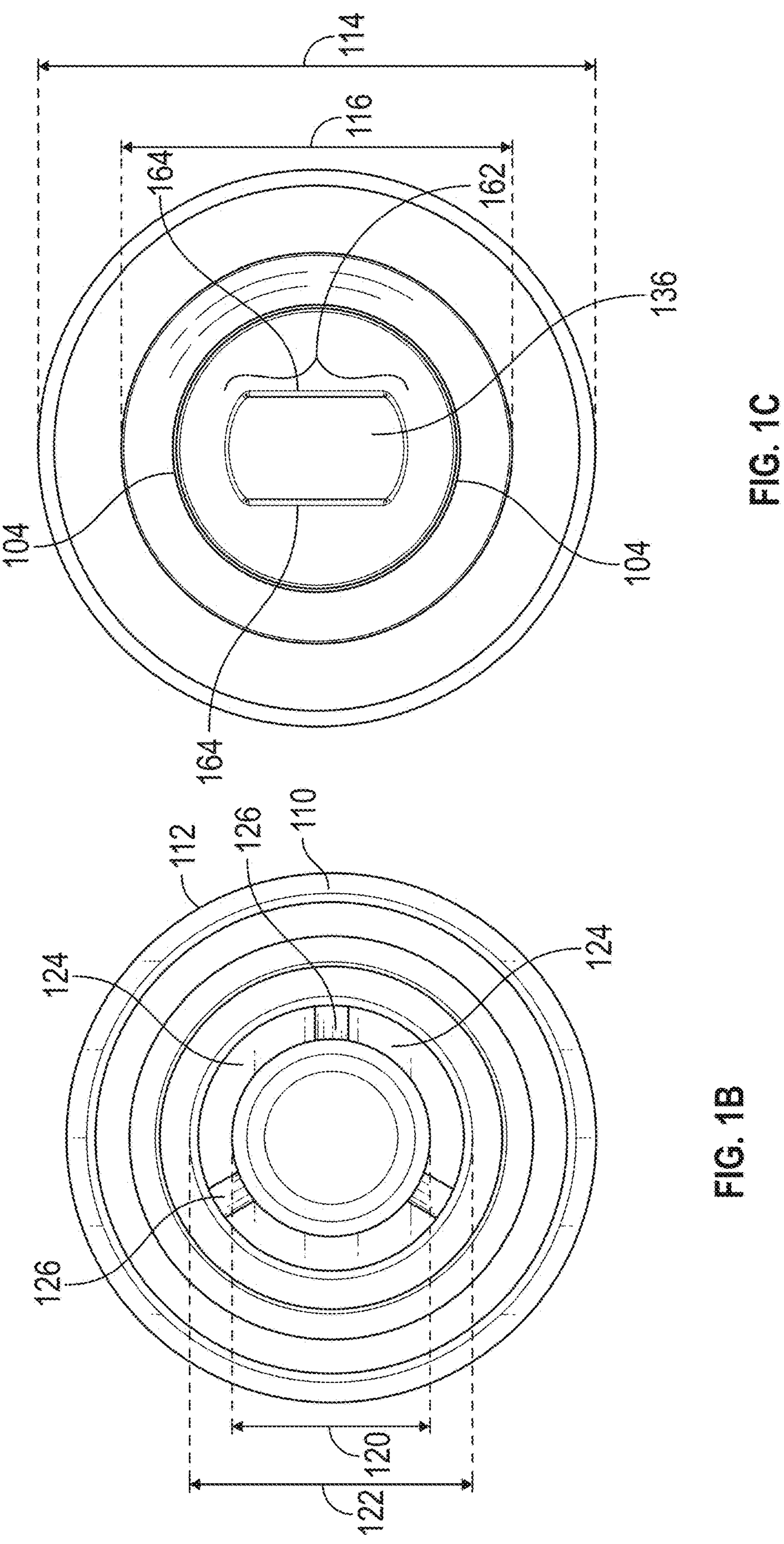
FIG. 1B, is an illustration showing the device of FIG. 1A, looking from the back along a central axis of the device.
FIG. 1C, is an illustration showing the device of FIG. 1A, looking from the front along a central axis of the device.

Unless otherwise noted, all measurements are in standard metric units.

Unless otherwise noted, all instances of the words "a," "an," or "the" can refer to one or more than one of the word that they modify.

In this application, the use of "or" means "and/or", unless specifically stated otherwise.

Unless otherwise noted, the phrase "one or more" means one or more than one of an object. For example, "one or more recesses" means a single recess, two recesses, three recesses, four or more recesses, or any combination thereof.

Unless otherwise noted, the term "about" refers to ±10% of the non-percentage number that is described, rounded to the nearest number to the accuracy shown. For example, about 105.3 mm, would include 94.8 to 115.8 mm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 100 to about 200 mm would include from 90 to 220 mm. For example, "about equal" that two or more objects having a measurement that matches within ±10%.

Unless otherwise noted, the phrase "about planar" means planar with from 0 to 15 degrees of curvature.

Unless otherwise noted, the term "substantially" refers ±5% of the non-percentage number that is described, rounded to the nearest number to the accuracy shown. For example, substantially 105.3 mm, would include 100.0 to 110.6 mm. When the term "substantially" is discussed in terms of a range, then the term refers to the appropriate amount less than the lower limit and more than the upper limit. For example, from substantially 100 to about 200 mm would include from 95 to 210 mm.

Unless otherwise noted, the term "substantially equal" or "substantially matches" means that two or more objects having a measurement that matches within ±5%.

Unless otherwise noted, the term "substantially flat" means planar or flat with from 0 to 10 degrees of curvature.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, when the term "diameter" refers to a circular shape or face, then the diameter refers to a longest distance across the circular shape or face. When the term "diameter" refers to a shape or face having a non-circular shape, then the term "diameter" refers to a longest distance across the non-circular shape or face. Examples of non-circular shapes include an oval or ellipse, a square, a hexagon, or an octagon. When a raised portion includes two or more protrusions forming a raised lip, then the diameter would be the longest distance between two protrusions of the one or more protrusions. The term diameter should not be interpreted as automatically implying a circle.

Unless otherwise noted, the terms "raised" and "recessed" are terms that are relative to one another. For example, a "raised" portion is raised, higher than, or elevated relative to the recessed portion and a "recessed" portion is recessed, depressed, indented, or lower relative to the raised portion.

Unless otherwise noted, the term "product" refers to a substance contained within a pipeline. A product can be a fluid, liquid, gas, condensate, or slurry or any form of matter capable of flowing from an upstream direction to a downstream direction.

Unless otherwise noted, the term "device" and "pig" are used interchangeably throughout this disclosure.

Unless otherwise noted, the terms "first," "second," and "third" are arbitrary designators of convenience that distinguish which device or which part of a device are being referred to; they do not necessarily refer to any order or sequence. For example, the disclosure may recite "a device having a device front face" when referring to a single device or an embodiment of a device. However, when referring to five embodiments of the device, then specific devices and the specific device's part can be referred to as a "first device having a first device front face," a "second device having a second device front face," a "third device having a third device front face," a "fourth device having a fourth device front face," and a "fifth device having a fifth device front face," etc., for as many devices as are numbered. In other words, the term "first" or "second" can be inserted in front of objects herein to refer to any embodiment of a device or any part of device described herein, even if not specifically referred to a first device or first device front face herein. When describing two or more devices, this terminology clearly indicates which device and which part of a device is being referred to.

Unless otherwise noted, properties (height, width, length, ratio etc.) as described herein are understood to be averaged measurements. For example, when measuring a length between two points, the average length would be ascertained by measuring the length three times and dividing the aggregate length by three to yield the averaged length.

Unless otherwise noted, ranges of easily varied measurements, such as length, width, height, and weight, refer to every integer within the range, sub-ranges, and combinations thereof. For example, from 1.0 mm to 5.0 mm in length, refers to 1.0 mm, 2.0 mm, 3.0 mm, 4.0 mm, 5.0 mm, ranges of 1.0 mm to 3.0 mm, 3.0 mm to 4.0 mm, and combinations thereof.

Pig launchers can be categorized into two types. Single pig launchers which are only capable of launching a single pig versus multi-pig launchers capable of holding and launching multiple pigs. One of the benefits of a multi-pig launcher is allowing for more than one pig to be launched at predetermined intervals without the need to repeatedly open and close the launcher to access the pipeline. This feature has the additional benefits of reducing personnel risk, environmental hazards, and time when accessing the pipeline system.

It has been discovered that conventional systems of pigs and multi-pig launchers suffer from problems of accidental multi-pig launches. For context, many conventional multi-pig launchers rely on gravity to pull a pig toward the launch portal, a fluid flow pressure within the pig launcher bay to push or suck the pig toward the launch portal, or a mechanical means, such as a screw, to push the pigs within the pig launcher bay toward the launch portal. As the pigs are bunched or stacked together by the force of gravity, pressure, or mechanical force, adjacent pigs tend to stick or adhere together due to such mechanisms as mechanical entanglement and/or vacuum seal formation between adjacent pigs. When two or more adjacent pigs are adhered together, then when the pig closest to the launch port moves into the product stream of the pipeline, the adhesion between the pigs tends to cause one or more of the other, adjacent adhered pigs to enter the product stream simultaneously. This problem defeats one of the major benefits of a multi-pig launcher, which is to control the launch of pigs by launching them individually at predetermined times.

A pig or a device has been discovered that overcomes this accidental multiple pig or multiple device launch problem when used in a multi-pig launcher or a multi-device launcher. The pig or device disclosed herein features a device front face and a device back lip that avoid or reduce adhesion between adjacent devices by avoiding or reducing the possibility of mechanical adhesion and/or vacuum formation. The devices include a device front face having a front face diameter and a device back lip having a back lip internal diameter and a back lip external diameter. The back lip internal diameter and a back lip external diameter complement the front face diameter, such that the front face of one pig can be positioned or aligned to push against the device back lip of an adjacent pig. The device front face and the device back lip have smooth, complementary contours, which avoids or reduces entanglement. The device back lip also features a shape having a raised portion, such as a raised ring, and a recessed portion, such as one or more notches in the raised ring. The one or more recesses or notches avoid or reduce vacuum seal formation between adjacent pigs. In some embodiments, the pig front face also includes a front protrusion. A benefit of the front protrusion can be to align or position the front face of one device against the device back lip of an adjacent device to facilitate one device pushing against another to drive them toward the launch port of a device launcher, such as a pig launcher. Further, the front protrusion can act as an additional standoff to further reduce or avoid vacuum seal formation between adjacent devices.

One of the benefits of the devices disclosed herein is that they can overcome this multi-device launch problem without requiring changes or modifications to the multi-device launcher itself. Therefore, the devices disclosed herein can be used in or retrofitted to nearly any multi-device launcher. Also, the devices disclosed herein incorporate the materials and design elements common to many conventional pigs, such that the devices disclosed herein can be used in various pig launchers, including a single pig launcher. If the devices disclosed herein are used in a single pig launcher, then many of the features, such as the smooth device front face or device back lip shape lie dormant as unneeded; they do not reduce the effectiveness of the device or pig to function as a pig. This commonality allows operators to adopt a uniform device for their single and multi-pig launchers.

One of the benefits of the devices disclosed herein is that some embodiments of the devices can be made of a single, continuous material, such as an injection molded polymeric material or a cast molded polymeric material. Being made of a single material can make the devices easier to manufacture, simple to use with no moving or breakable parts, and as rugged as the material they are made of. Another benefit of the devices disclosed herein can be that the devices can be hollow with a hollow interior extending from about 30% to 95% of a device length. This hollow interior can be used to save costs on the materials used to make the devices and the weight of the devices during shipping and handling. The hollow interior can also be fitted with one or more devices such as a tracker, for locating the pig within a pipeline, or a weight, for jobs requiring a heavier pig.

The design of the devices having a vent or notch in the device back lip works together with some of the other design features such as the device being made of a single polymeric material and having a hollow interior. Due to the elastic and potentially airtight body of the device, the device would have been highly susceptible to forming a vacuum between adjacent pigs without the design of the complementary front face and back lips, including the vents, notches, or recessed portions of the device back lip.

In more detail, devices for performing maintenance on a pipeline are disclosed herein.

Referring to FIG. 1A, FIG. 1B, FIG. 1C, FIG. 2A, FIG. 2B, FIG. 2C, and FIG. 2D, in some embodiments, the device 100, 200 for performing maintenance on a pipeline, includes: a device body 102, wherein the device body includes a device front face 104 connected to a device back lip 106 by a device side 108, wherein the device side includes three wings 110 extending outward from the device side, and the wings have an outermost lip 112 having a wing external diameter 114. In some embodiments, the device front face includes a front face diameter 116, wherein the device back lip includes a back lip shape 118, wherein the back lip shape includes a back lip internal diameter 120 and a back lip external diameter 122, wherein the back lip internal diameter is less than or equal to the wing external diameter, and wherein the back lip shape includes a raised portion 124 and a recessed portion 126. In some embodiments, one, two, three, or four of the device front face, the device back lip, the device side, and the one to nine wings include a polymer material. In some embodiments, the device includes a hollow interior 150, wherein the hollow interior has a hollow interior length 152, wherein the hollow interior length is from about 30% to 95% of a device length 142, and the device back lip is a back lip opening 154 of the hollow interior.

In some embodiments, the device includes a device interior surface 130, and wherein the device side includes a device side interior surface 132 and a device side exterior surface 134, and the device interior surface includes the device side interior surface, and the device back lip connects the device side interior surface and the device side exterior surface. In some embodiments, the front face includes a front protrusion 136, and the front protrusion extends a front protrusion length 138 away from the device front face. In some embodiments, the wings have a concave opening 140 and the concave opening faces toward the device back lip. In some embodiments, the device side includes a device external surface, and the device external surface has a side external diameter and the side external diameter is greater than or substantially equal to the front face diameter. In some embodiments, the device side includes a device external surface, and the device external surface has a side external diameter 144 and the side external diameter is substantially equal to the back lip external diameter. In some embodiments, wherein the device has a device length 142 and the device length is from 170% to about 230% of the wing external diameter. In some embodiments, the device has a device length and the device length is from 130% to about 170% of the wing external diameter. In some embodiments, the hollow interior includes a device interior surface 130 and a hollow interior internal diameter 156. In some embodiments, the hollow interior diameter is about equal to or less than the back lip internal diameter for half, most, or all of the hollow interior length. In some embodiments, the device interior surface includes a device side interior surface 132 connected to a device front interior surface 158, wherein the device side includes a device side exterior surface 134, and wherein the device back lip 106 connects the device side interior surface 132 and the device side exterior surface 134, and wherein the hollow interior diameter 156 is about equal to or less than the back lip internal diameter 120.

Referring to FIG. 2B, an equilibrium port 170 can extend through the device side, providing opening that connects the device side exterior surface to the device side interior surface.

A method of performing maintenance on a pipeline is disclosed herein. In some embodiments, the method includes: referring to FIG. 4, in some embodiments of the method, the method includes providing a device launcher 400 operatively connected to a pipeline 402 by a launch port 404, wherein the pipeline has an upstream direction 406, a downstream direction 408, a pipeline internal diameter 410, the pipeline contains a product 412, and the device launcher includes a launch bay 414 having a launch bay length 416 and a launch bay diameter 418; providing a device as disclosed above; and inserting the device into the launch bay of the device launcher with the device front face closer to the launch port than the device back lip. In some embodiments of the method, the method includes, referring to FIG. 1A, FIG. 1B, FIG. 1C, FIG. 2A, FIG. 2B, FIG. 2C, and FIG. 2D, providing a device a device body 102, wherein the device body includes a device front face 104 connected to a device back lip 106 by a device side 108, wherein the device side includes three wings 110 extending outward from the device side, and the wings have an outermost lip 112 having a wing external diameter 114, wherein the device front face includes a front face diameter 116, wherein the device back lip includes a back lip shape 118, wherein the back lip shape includes a back lip internal diameter 120 and a back lip external diameter 122, wherein the back lip internal diameter is less than or equal to the wing external diameter, and wherein the back lip shape includes a raised portion 124 and a recessed portion 126. In some embodiments, the device includes a device interior surface, and wherein the device side includes a device side interior surface and a device side exterior surface, and the device interior surface includes the device side interior surface, and the device back lip connects the device side interior surface and the device side exterior surface; and the front face includes a front protrusion, and the front protrusion extends a front protrusion length away from the device front face; and the wings have a concave opening and the concave opening faces toward the device back lip. In some embodiments, one, two, three, or four of the device front face, the device back lip, the device side, and the one to nine wings include a polymer material. In some embodiments, the device includes a hollow interior, wherein the hollow interior has a hollow interior length, wherein the hollow interior length is from about 30% to 95% of a device length, and the device back lip is a back lip opening of the hollow interior.

In some embodiments of the method, the device side includes a device external surface, and the device external surface has a side external diameter and the side external diameter is greater than or substantially equal to the front face diameter; wherein the device side includes a device external surface, and the device external surface has a side external diameter 144 and the side external diameter is substantially equal to the back lip external diameter; and wherein the device has a device length 142 and the device length is from 170% to about 230% of the wing external diameter.

Figures 3A, 3B, 3C:
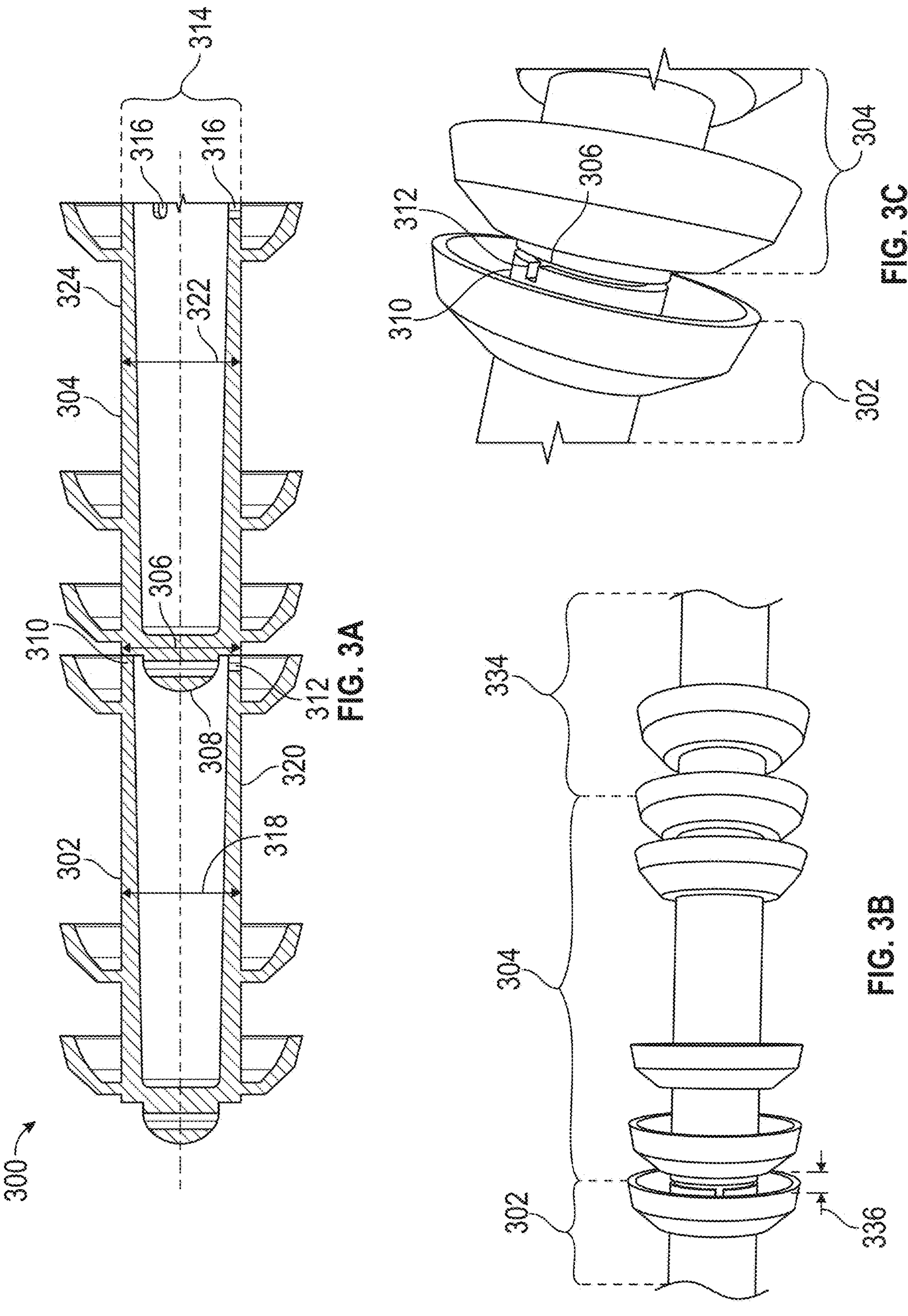
FIG. 3A is a cutaway diagram showing two embodiments of the device from FIG. 1A, presented with the devices arranged front to back relative to one another.
FIG. 3B is an illustration showing the three embodiments of the devices of FIG. 3A, arranged front to back relative to one another, shown from a side view.
FIG. 3C is an illustration showing the devices from FIG. 3B, focusing on where the two devices make contact with one another.
Figure 4:
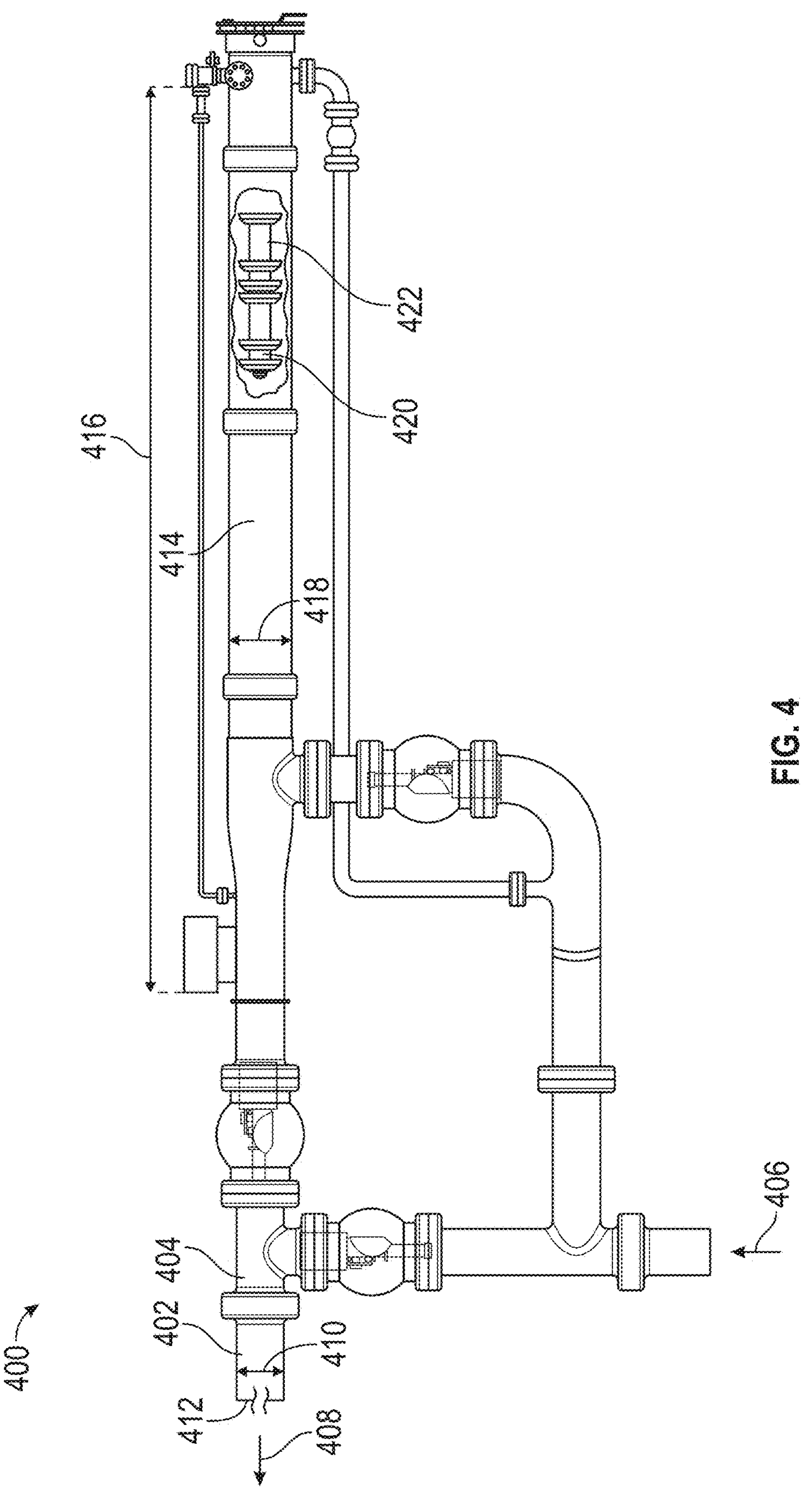
FIG. 4 is a schematic illustration showing an embodiment of the devices disclosed herein in a device launcher connected to a pipeline.

Referring to FIG. 3A and FIG. 4, in some embodiments, the method includes providing a plurality of devices 300, including a first device 302, 420 and a second device 304, 422, wherein the second device has a second device front face 306 and a second protrusion 308, extending from the second device front face. In some embodiments of the method, the method includes driving the second device front face against the device back lip 310 of the first device. The first device includes a first recessed portion 312 to avoid or reduce vacuum formation between the first device and the second device. The second device shown in FIG. 3A includes a device back lip 314 that also includes a second recessed portion 316, which allows for a third device 334 to be added to the stack of device. In some embodiments of the method, the method includes the first device has a first side external diameter 318 of the first side external surface 320. In some embodiments of the method, the method includes the second device has a second side external diameter 322 of the second side external surface 324. In some embodiments, the first and second side external diameters are substantially equal.

In some embodiments, the front face includes a front protrusion, and the front protrusion extends a front protrusion length away from the device front face, and wherein front protrusion has a tapering front protrusion shape 162 having from 1, 2, 3, 4, 5, 6, 7, or 8 or more substantially flat protrusion sides 164; or any combination thereof.

Referring to FIG. 3B, in some embodiments of the method, the method includes providing a first device 302, a second device 304, and a third device 334, and using the third device to drive the first and second devices towards a launch port in the device launcher. In some embodiments of the method, the method includes forming an interface 336 between adjacent devices. In some embodiments, the method includes, referring to FIG. 3C, driving the second device front face 306 of the second device 304 against the first device back lip 310 of the first device 302 with a first recessed portion 312 to avoid or reduce vacuum seal formation. Referring to FIG. 4, in some embodiments, the method can include a first device, a second device, and a third device in the device launcher.

In some embodiments of the device front face diameter the back lip internal diameter, and/or the side external diameter are substantially equal or about equal. In some embodiments of the device, from about 80% to 100% of the device weight includes a single material, wherein in the single material is a polyurethane, high density polyethylene, a rubber, such as a polybutylene succinate rubber, or a copolymer thereof. In some embodiments of the device, the single material is an elastomer or a rubber. In some embodiments, the device front face, the device back lip, the device side, and/or the one to nine wings include the polymer material.

It is understood from the context of this disclosure that many of the measurements of the device depend on the internal diameter of the pipeline being maintained. Once the internal diameter of the pipeline undergoing maintenance is known, the wing external diameter of the device is set to complement the internal diameter of the pipeline. The length of the device and the external diameter are then set relative to the wing external diameter of the device. In some embodiments, the wing external diameter is from about 30.0 cm to about 76.2 cm. This would bring the device length to about 45.0 cm to about 114.3 cm, and the side external diameter and/or front face diameter to about 15.0 cm to about 38.1 cm.

In some embodiments, the back lip internal diameter is from about 70% to about 60% of the wing external diameter, including about 65% of the wing external diameter. In some embodiments, the back lip internal diameter is less than the front face diameter and the back lip external diameter is about 50% to 110% of the front face diameter, including from about 70% to about 90% of the front face diameter. In some embodiments, the back lip internal diameter is less than the front face diameter and the back lip external diameter is about 90% to 110% of the front face diameter, including about 95 to about 105% of the front face diameter. In some embodiments, the device has a device length and the device length is from 130% to about 170% of the wing external diameter, including about 140% to about 160% of the wing external diameter. In some embodiments, the device has a device length and the device length is from 170% to about 230% of the wing external diameter, including from about 190% to about 210% of the wing external diameter.

Detailed Embodiments

Embodiment 1. A device for performing maintenance on a pipeline, comprising: a device body, wherein the device body includes a device front face connected to a device back lip by a device side,

- wherein the device side includes one to nine wings extending outward from the device side, and the wings have an outermost lip having a wing external diameter,
- wherein the device front face includes a front face diameter,
- wherein the device back lip includes a back lip shape, wherein the back lip shape includes a back lip internal diameter and a back lip external diameter,
- wherein the back lip internal diameter is less than or equal to the wing external diameter, and
- wherein the back lip shape includes a raised portion and a recessed portion; and
- wherein one, two, three, or four of the device front face, the device back lip, the device side, and the one to nine wings include a polymer material; or
- wherein the device includes a hollow interior, wherein the hollow interior has a hollow interior length, wherein the hollow interior length is from about 30% to 95% of a device length, and the device back lip is a back lip opening of the hollow interior; or both.

Embodiment 2. The device of one or more of embodiments 1-7 and 14, wherein two, three, or four of the device front face, the device back lip, the device side, and the one to nine wings include the polymer material; or

- wherein the polymer material is an elastomeric polymer; or
- wherein the polymer material includes a polyurethane, a high-density polyethylene, or a polybutylene succinate rubber, or any combination thereof; or
- wherein two, three, or four of the device front face, the device back lip, the device side, and the one to nine wings include and are connected by the polymer material; or
- wherein the device body includes or consists of the polymer material; or wherein the device body is injection molded or cast molded from the polymer material; or any combination thereof.

Embodiment 3. The device of one or more of embodiments 1-7 and 14, wherein the hollow interior includes a device interior surface and a hollow interior internal diameter; and

- wherein the hollow interior diameter is about equal to or less than the back lip internal diameter for at least a portion of the hollow interior length; or
- wherein the device interior surface includes a device side interior surface connected to a device front interior surface,
- wherein the device side includes a device side exterior surface, and
- wherein the device back lip connects the device side interior surface and the device side exterior surface, and wherein the hollow interior diameter is about less than or equal to the back lip internal diameter; or any combination thereof.

Embodiment 4. The device of one or more of embodiments 1-7 and 14, wherein the raised portion includes a segment of a raised lip and the recessed portion includes one or more recesses separating the segment of the raised lip; or

- wherein the raised portion includes a segment of a raised lip, and the recessed portion includes one or more recesses separating the segment of the raised lip, and wherein the recessed portion extends a recessed length from the raised lip toward the device front face; or
  - wherein the raised portion includes a raised number of raised lips and a recessed number of recesses, and the raised number equals the recessed number, and the recessed portions separate the raised lips; or
  - wherein the raised portion includes a raised number of raised lips and a recessed number of recesses, and the raised number equals the recessed number, and the recessed portions separate the raised lips, and the recessed number is from 1-16; or
- wherein the raised portion includes a raised lip and the recessed portion includes 1-16 notches or vents located along the raised lip;
  - wherein the device side includes a device side interior surface and a device side exterior surface, and the raised shape connects the device side interior surface and a device side exterior surface; or
  - wherein the raised portion includes two or more protrusions forming a raised lip and the recessed portion includes two or more recesses, and the two or more recesses separate the two or more protrusions; or any combination thereof.

Embodiment 5. The device of one or more of embodiments 1-7 and 14, wherein the back lip internal diameter is from about 70% to about 60% of the wing external diameter; or wherein the back lip internal diameter is less than the front face diameter and the back lip external diameter is about 50% to 110% of the front face diameter; or wherein the back lip internal diameter is less than the front face diameter and the back lip external diameter is about 90% to 110% of the front face diameter; or wherein the back lip internal diameter complements or substantially matches the front face diameter; or wherein the device includes a device interior surface, and wherein the device side includes a device side interior surface and a device side exterior surface, and the device interior surface includes the device side interior surface, and the device back lip connects the device side interior surface and the device side exterior surface; or wherein the front face includes a front protrusion, and the front protrusion extends a front protrusion length away from the device front face; or wherein the wings have a concave opening and the concave opening faces toward the device back lip, or wherein the wings have about planar sides; or any combination thereof.

Embodiment 6. The device of one or more of embodiments 1-7 and 14, wherein the device side includes a device external surface, and the device external surface has a side external diameter and the side external diameter is greater than or substantially equal to the front face diameter; or wherein the device side includes a device external surface, and the device external surface has a side external diameter and the side external diameter is substantially equal to the back lip external diameter; or wherein the device has a device length and the device length is from 130% to about 170% of the wing external diameter;

wherein the device has a device length and the device length is from 170% to about 230% of the wing external diameter;

or any combination thereof.

Embodiment 7. The device of one or more of embodiments 1-7 and 14, wherein the front face includes a front protrusion, and the front protrusion extends a front protrusion length away from the device front face, and wherein front protrusion has a tapering front protrusion shape having a semi-circular shape or an elliptical shape; or wherein the front face includes a front protrusion, and the front protrusion extends a front protrusion length away from the device front face, and wherein front protrusion has a tapering front protrusion shape having from 1, 2, 3, 4, 5, 6, 7, or 8 or more substantially flat protrusion sides; or any combination thereof.

Embodiment 8. A method of performing maintenance on a pipeline comprising:

providing a device launcher operatively connected to a pipeline by a launch port, wherein the pipeline has an upstream direction, a downstream direction, a pipeline internal diameter, the pipeline contains a product, and the device launcher includes a launch bay having a launch bay length and a launch bay diameter, and providing a device, wherein the device includes a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the back lip shape includes a raised portion and a recessed portion; and wherein one, two, three, or four of the device front face, the device back lip, the device side, and the one to nine wings include a polymer material; or wherein the device includes a hollow interior, wherein the hollow interior has a hollow interior length, wherein the hollow interior length is from about 30% to 95% of a device length, and the device back lip is a back lip opening of the hollow interior; or both; and inserting the device into the launch bay of the device launcher with the device front face closer to the launch port than the device back lip.

Embodiment 9. The method of one or more of embodiments 8-13 and 15, further comprising:

providing a second device, wherein the second device includes a second device body, wherein the second device body includes a second device front face connected to a second device back lip by a second device side, wherein the second device side includes one to nine wings extending outward from the device side, and the wings have a second outermost lip having a second wing external diameter, wherein the second device front face includes a second front face diameter, wherein the second device back lip includes a second back lip shape, wherein the second back lip shape includes a second back lip internal diameter and a second back lip external diameter, wherein the second back lip internal diameter is less than or equal to the second wing external diameter, and wherein the second back lip shape includes a second raised portion and a second recessed portion; and wherein one, two, three, or four of the second device front face, the second device back lip, the second device side, and the one to nine wings include a second polymer material; or wherein the second device includes a second hollow interior, wherein the second hollow interior has a second hollow interior length, wherein the second hollow interior length is from about 30% to 95% of a second device length, and the second device back lip is a second back lip opening of the second hollow interior; or both; and inserting the second device into the launch bay of the device launcher with the second device front face closer to the launch port than the second device back lip.

Embodiment 10. The method of one or more of embodiments 8-13 and 15, further comprising:

bringing the device back lip into contact with the second device front face or a second device wing, or both.

Embodiment 11. The method of one or more of embodiments 8-13 and 15, further comprising:

driving the device toward the launch port by pressing the second device front face, the second device wing, or both, against the device back lip.

Embodiment 12. The method of one or more of embodiments 8-13 and 15, wherein the launch bay length is from 3.5 to 17 times the pipeline internal diameter; or the launch bay diameter is within about 10% of the pipeline internal diameter; or both.

Embodiment 13. The method of one or more of embodiments 8-13 and 15, further comprising:

providing from 4 to 10 of the devices;

forming pairs of devices, including a device closer to the launch port adjacent to a device further from the launch port by inserting each device into the launch bay of the device launcher with each device front face closer to the launch port than each device back lip;

bringing the device back lip of the device closer to the launch port into contact with the front face of the device further from the launch port; and driving the device closer the launch port toward the launch port by pressing the front face of the device further from the launch port against the device back lip of the device closer to the launch port.

Embodiment 14: A device for performing maintenance on a pipeline, comprising: a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the back lip shape includes a raised portion and a recessed portion.

Embodiment 15: A method of performing maintenance on a pipeline comprising:

providing a device launcher operatively connected to a pipeline by a launch port, wherein the pipeline has an upstream direction, a downstream direction, a pipeline internal diameter, the pipeline contains a product, and the device launcher includes a launch bay having a launch bay length and a launch bay diameter, and providing a device of one or more of embodiments 1-7 and 14; and inserting the device into the launch bay of the device launcher with the device front face closer to the launch port than the device back lip.

Examples

The devices were formed by polymer molding of a polyurethane rubber according to a schematic in FIG. 1A, wherein the device length was about 30.25 inches (76.8 cm) and the back lip external diameter and the front face diameter were about 8.0 inches (20.3 cm), and the wing external diameter was about 15.9 inches (40.4 cm). The devices were loaded into a commercial multi-device launcher (SURE-LAUNCH® Multi-Pig Launching System, WeldFit LLC, Houston, Texas) with the device front face closest to the launch port of the multi-device launcher. Three or more devices were loaded into the launch bay of the multi-device launcher.

What is claimed is:

1. A device for performing maintenance on a pipeline, comprising:

a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the device front face, the device back lip, the device side, and the one to nine wings include and are connected by a polymer material and wherein the device body is injection molded or cast molded from the polymer material; and wherein the device includes a hollow interior, wherein the hollow interior has a hollow interior length, wherein the hollow interior length is from about 30% to 95% of a device length, and the device back lip is a back lip opening of the hollow interior; and wherein the back lip shape includes a raised portion and a recessed portion, wherein the recessed portion includes a vent, and wherein the vent includes a notch.

2. The device of claim 1, wherein the polymer material is an elastomeric polymer; or wherein the polymer material includes a polyurethane, a high-density polyethylene, or a polybutylene succinate rubber, or any combination thereof;

or any combination thereof.

3. The device of claim 1, wherein the hollow interior includes a device interior surface and a hollow interior internal diameter; and wherein the hollow interior diameter is about equal to or less than the back lip internal diameter for at least a portion of the hollow interior length; or wherein the device interior surface includes a device side interior surface connected to a device front interior surface, wherein the device side includes a device side exterior surface, and wherein the device back lip connects the device side interior surface and the device side exterior surface, and wherein the hollow interior diameter is about less than or equal to the back lip internal diameter; or any combination thereof.

4. The device of claim 1, wherein the raised portion includes a segment of a raised lip and the recessed portion includes one or more recesses separating the segment of the raised lip; or wherein the raised portion includes a segment of a raised lip, and the recessed portion includes one or more recesses separating the segment of the raised lip, and wherein the recessed portion extends a recessed length from the raised lip toward the device front face; or wherein the raised portion includes a raised number of raised lips and a recessed number of recesses, and the raised number equals the recessed number, and the recessed portions separate the raised lips; or wherein the raised portion includes a raised number of raised lips and a recessed number of recesses, and the raised number equals the recessed number, and the recessed portions separate the raised lips, and the recessed number is from 1-16; or wherein the raised portion includes a raised lip and the recessed portion includes 1-16 notches or vents located along the raised lip;

wherein the device side includes a device side interior surface and a device side exterior surface, and the raised shape connects the device side interior surface and a device side exterior surface; or wherein the raised portion includes two or more protrusions forming a raised lip and the recessed portion includes two or more recesses, and the two or more recesses separate the two or more protrusions; or any combination thereof.

5. The device of claim 1, wherein the back lip internal diameter is from about 70% to about 60% of the wing external diameter; or wherein the back lip internal diameter is less than the front face diameter and the back lip external diameter is about 50% to 110% of the front face diameter; or wherein the back lip internal diameter is less than the front face diameter and the back lip external diameter is about 90% to 110% of the front face diameter; or wherein the back lip internal diameter complements or substantially matches the front face diameter; or wherein the device includes a device interior surface, and wherein the device side includes a device side interior surface and a device side exterior surface, and the device interior surface includes the device side interior surface, and the device back lip connects the device side interior surface and the device side exterior surface; or wherein the front face includes a front protrusion, and the front protrusion extends a front protrusion length away from the device front face; or wherein the wings have a concave opening and the concave opening faces toward the device back lip, or wherein the wings have about planar sides; or any combination thereof.

6. The device of claim 1, wherein the device side includes a device external surface, and the device external surface has a side external diameter and the side external diameter is greater than or substantially equal to the front face diameter; or wherein the device side includes a device external surface, and the device external surface has a side external diameter and the side external diameter is substantially equal to the back lip external diameter; or wherein the device has a device length and the device length is from 130% to about 170% of the wing external diameter; or wherein the device has a device length and the device length is from 170% to about 230% of the wing external diameter;

or any combination thereof.

7. The device of claim 1, wherein the front face includes a front protrusion, and the front protrusion extends a front protrusion length away from the device front face, and wherein front protrusion has a tapering front protrusion shape having a semi-circular shape or an elliptical shape; or wherein the front face includes a front protrusion, and the front protrusion extends a front protrusion length away from the device front face, and wherein front protrusion has a tapering front protrusion shape having from 1, 2, 3, 4, 5, 6, 7, or 8 or more substantially flat protrusion sides; or any combination thereof.

8. The device of claim 1, wherein the device body consists of the polymer material.

9. A method of performing maintenance on a pipeline comprising:

providing a device launcher operatively connected to a pipeline by a launch port, wherein the pipeline has an upstream direction, a downstream direction, a pipeline internal diameter, the pipeline contains a product, and the device launcher includes a launch bay having a launch bay length and a launch bay diameter, and providing a device, wherein the device includes a device body, wherein the device body includes a device front face connected to a device back lip by a device side, wherein the device side includes one to nine wings extending outward from the device side, and the wings have an outermost lip having a wing external diameter, wherein the device front face includes a front face diameter, wherein the device back lip includes a back lip shape, wherein the back lip shape includes a back lip internal diameter and a back lip external diameter, wherein the back lip internal diameter is less than or equal to the wing external diameter, and wherein the device front face, the device back lip, the device side, and the one to nine wings include and are connected by a polymer material and wherein the device body is injection molded or cast molded from the polymer material; and wherein the device includes a hollow interior, wherein the hollow interior has a hollow interior length, wherein the hollow interior length is from about 30% to 95% of a device length, and the device back lip is a back lip opening of the hollow interior; and wherein the recessed portion includes a vent, and wherein the vent includes a notch and inserting the device into the launch bay of the device launcher with the device front face closer to the launch port than the device back lip.

10. The method of claim 9, further comprising:

providing a second device, wherein the second device includes a second device body, wherein the second device body includes a second device front face connected to a second device back lip by a second device side, wherein the second device side includes one to nine second wings extending outward from the second device side, and the second wings have a second outermost lip having a second wing external diameter, wherein the second device front face includes a second front face diameter, wherein the second device back lip includes a second back lip shape, wherein the second back lip shape includes a second back lip internal diameter and a second back lip external diameter, wherein the second back lip internal diameter is less than or equal to the second wing external diameter, and wherein the second device front face, the second device back lip, the second device side, and the one to nine second wings include and are connected by a second polymer material and wherein the second device body is injection molded or cast molded from the second polymer material; and wherein the second device includes a second hollow interior, wherein the second hollow interior has a second hollow interior length, wherein the second hollow interior length is from about 30% to 95% of a second device length, and the second device back lip is a second back lip opening of the second hollow interior; and wherein the second recessed portion includes a second vent, and wherein the second vent includes a second notch;

and inserting the second device into the launch bay of the device launcher with the second device front face closer to the launch port than the second device back lip.

11. The method of claim 10, further comprising:

bringing the device back lip into contact with the second device front face or a second device wing, or both.

12. The method of claim 11, further comprising:

driving the device toward the launch port by pressing the second device front face, the second device wing, or both, against the device back lip.

13. The method of claim 9, wherein the launch bay length is from 3.5 to 17 times the pipeline internal diameter; or the launch bay diameter is within about 10% of the pipeline internal diameter; or both.

14. The method of claim 9, further comprising:

providing from 4 to 10 of the devices;

forming pairs of devices, including a device closer to the launch port adjacent to a device further from the launch port by inserting each device into the launch bay of the device launcher with each device front face closer to the launch port than each device back lip;

bringing the device back lip of the device closer to the launch port into contact with the front face of the device further from the launch port; and driving the device closer to the launch port by pressing the front face of the device further from the launch port against the device back lip of the device closer to the launch port.

* * * * *